Dec. 26, 1950

C. B. JONES 2,535,497

LIMIT CONTROL FOR MAGNETIC RECORDERS

Filed April 12, 1946

2 Sheets-Sheet 1

INVENTOR.
CARY B. JONES

BY Pineles & Greene

ATTORNEYS

INVENTOR.
CARY B. JONES
BY Pineles & Greene
ATTORNEYS

Patented Dec. 26, 1950 2,535,497

UNITED STATES PATENT OFFICE 2,535,497

LIMIT CONTROL FOR MAGNETIC RECORDERS

Cary B. Jones, Grand Rapids, Mich., assignor to The Brush Development Co., Cleveland, Ohio, a corporation of Ohio Application April 12, 1946, Serial No. 661,487

4 Claims. (Cl. 179—100.2)

This application is a continuation-in-part of my application Serial No. 526,006, filed March 11, 1944, which issued as Patent No. 2,432,162 on December 9, 1947.

This invention relates to magnetic recording and reproducing apparatus in which a magnetic record member, such as a wire, filament or tape, is employed for recording signals or for reproducing the recorded signals by electro-magnetic interlinkage between the record member and an adjacent winding constituting part of a transducer head.

In the operation of such recording and reproducing apparatus the record member, such as a wire or tape, is transferred between two reels, and during such transfer the electro-magnetic interlinkage is established by which the signals are recorded or subsequently reproduced.

In order to prevent breaking of the record member at either end where it is fastened to one of the reels, it is necessary to stop the driving device for the reels, which is usually an electric motor, although it may alternatively be a mechanical device.

It is one of the main objects of this invention to provide a novel record member suitable for control functions, and a method of operation which will indicate in a simple manner that an end of the record member is being approached, so the driving motor may be stopped in proper time to avoid stressing or breaking the record member.

It is a further object of my invention to provide a system wherein an indication of the imminent approach of the end of the record member may be utilized to perform a suitable control operation in connection with the apparatus, such as stopping the movement of the record member in the then prevailing direction, or initiating a reverse winding operation to rewind the record member.

A further object of this invention is to provide a control element, which may also be made separately from the record member, and having the general physical appearance and dimensions of the record member, so the control element may be readily joined to the record member, the control element being characterized by having predetermined magnetic conditions which will generate a predetermined signal in an associated circuit for selectively controlling the apparatus in a predetermined manner when the record member reaches the end of its operating travel.

The foregoing and other objects of the invention will be readily understood from the following description of exemplifications thereof, and of apparatus in which it is used, reference being had to the accompanying drawings wherein Fig. 1 is a simple diagrammatic view illustrating the general relationship of the mechanical, magnetic, and electric elements of a magnetic recording and reproducing apparatus in which, and in cooperation with which, the present invention is utilized;

Figure 1:
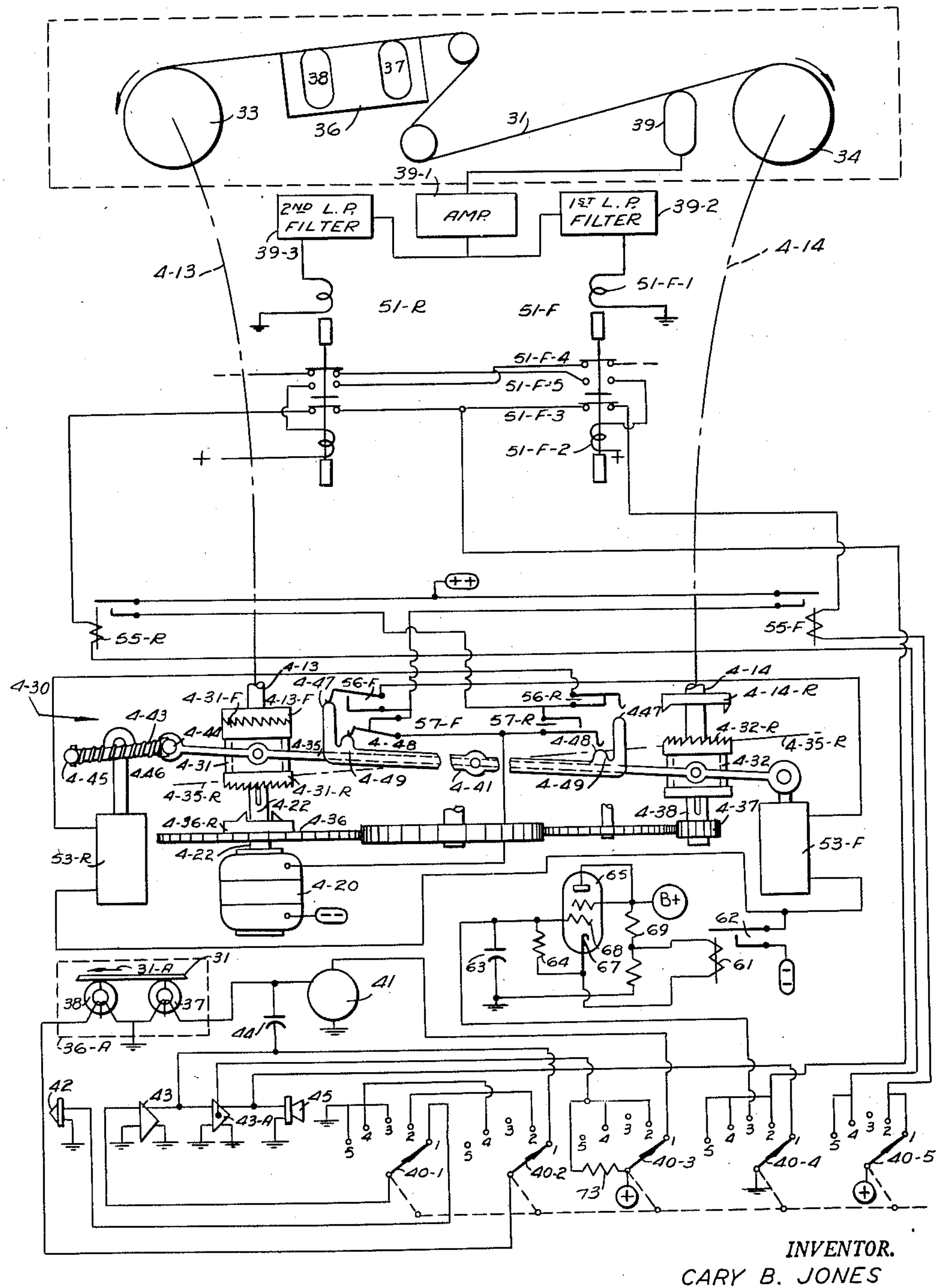

Fig. 1 illustrates in a simplified diagrammatic manner the general relationship of the mechanical, magnetic and electric elements of a magnetic recording and reproducing apparatus exemplifying the principles of the invention. A magnetic recording medium in the form of a thin flexible magnetic record member, such as a magnetic record wire, filament or wire-like tape 31, is arranged to be reeled on take-up reel 33 from supply reel 34, which are shown driven by a drive mechanism, including a drive shaft 4—13 and a drive shaft 4—14, to which the two reels 33, 34, respectively, are coupled.

There are various magnetic recording applications in which it is desirable to use the magnetic recording track as a control element for performing a control operation. Thus, for instance, when using a spirally coiled recording medium, such as a tape or wire, which is stored in spirally-coiled form on a reel, it is desirable to provide a control action which stops the motion of the reel at the end of the reeling operation when substantially the entire length of the signal carrier stored on the reel has been unwound therefrom.

Most of the known magnetic recording media, such as magnetic tapes or wire, which exhibit a magnetic coercive force and retentivity required for their usefulness as a magnetic signal carrier, may be subjected to a treatment which reduces their retentivity and coercive force to a low level so that the portions so treated cannot retain a recorded signal.

In particular, it has been found that in order to give a magnetic recording medium a high coercive force and magnetic retentivity required for recording, the molecular structure of the recording medium must be given a treatment which places it in a condition of special strain. Usually such materials have to be subjected to a special heat treatment in order to impart to them the required strain. By heating the so-treated material, this strain and the high coercive properties of such material may be removed.

According to the invention, a magnetic signal carrier, such as a tape or wire, which exhibits the high magnetic coercive force and retentivity required in order that it may serve as a magnetic signal recording medium, has a portion of its length treated by subjecting a sequence of successive elements of said length to a heat treatment which destroys its high coercive magnetic properties along a succession of intervals with the result that when a so-treated length of magnetic recording track is moved through a magnetic transducer-reproducer head, it will supply to the reproducing circuit a signal of a predetermined frequency which may be utilized to operate, for instance, a reproducing element, such as a relay, tuned to the selected frequency for stopping the motor which carries on the reeling operation or for performing a similar control operation.

Figures 2, 3, 4:
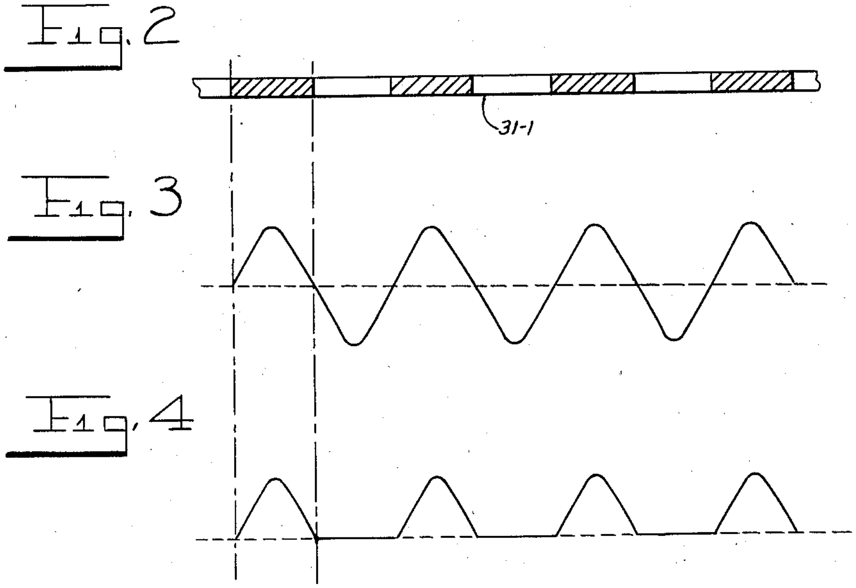
Fig. 2 is a simple schematic view of a record member, such as a wire or tape, which has been treated to have a predetermined magnetic condition in sequentially spaced elementary lengths, so that a signal of predetermined frequency will be established in a coupled circuit upon movement of the record member past the circuit at normal operating speed.
Fig. 3 is a graph showing an alternating current wave which may represent the respective polarities of the alternate magnetized elemental lengths of the record member in Fig. 2.
Fig. 4 is a view similar to Fig. 2, in which a rectified alternating current wave is shown to indicate alternate magnetized and non-magnetized or de-magnetized elemental lengths along the record member.

The record member 31 embodies a portion as a control element 31—1 which may be part of the main record member 31, or it may be a separate element otherwise physically similar in appearance and dimensions, and connected to one end of the record member. Thus, it will function during operation as a continuous element of the record member.

Where an end portion of the record member is employed for the purpose of this invention, it may be variously treated, as, for example, by heat treatment or by subjection to an alternating magnetic field, while moving through the heat zone or through the magnetic field at the normal operating speed, or at an elevated speed, so the wire will be magnetized or magnetically conditioned in the manner schematically indicated in Figs. 2, 3 and 4.

In the specific arrangement as seen in Fig. 1, magnetic recording and reproducing operations are carried on when the recording medium 31 is impelled in the forward direction indicated by arrow 31—A by driving and rotating reel 33 in counterclockwise direction. In order to play back the recorded program or to make a new record on the recording medium 31, it must be rewound on the supply reel 34 which is then driven and rotated in clockwise direction, as seen in Fig. 1.

In moving from one reel toward the other, the recording medium 31 is guided through a magnetic record transducer head structure 36 which operates to magnetically record, play back as well as erase the signals recorded on the recording medium 31. In the particular arrangement shown, the transducer head is also utilized for level winding the recording medium on the reel on which it is reeled. The transducer head structure 36 is not part of the invention and may be of the type described in the application of Semi Joseph Begun et al., Serial No. 550,570, filed August 22, 1944 (now abandoned) and its continuation-in-part application, Serial No. 688,738 which issued as Patent No. 2,513,617 on July 4, 1950, and is assigned to the same assignee as the present application.

In order to simplify the description of the circuits by means of which the recording, playback and erasing operations are performed, the elements of the transducer head structure 36 are also indicated in the circuit diagram of Fig. 1 by a dash-line rectangle 36—A, and is there shown provided with an erasing head 37 and a record transducing head 38. Each of the heads 37, 38 is shown provided with windings and a magnetic core structure which has pole pieces separated by a non-magnetic gap past which the recording medium 31 is moving in the direction of the arrow 31—A.

For the purpose of this invention, a monitoring head 39 is disposed adjacent the path of the recording medium for excitation by the recording medium prior to the action of the erasing head 37.

The recording medium 31 is guided through the monitoring head 39 first, and then through the transducer head structure so that during the recording operation each element of the recording medium passes successively first past the gap region of the erasing head 37 and then past the gap region of the record transducing head 38.

During operation the record carrier will be moved at operating speed past the monitoring head 39, and will induce in the associated control winding of the head 39 a voltage whose frequency will correspond to the frequency of the magnetic conditioning of the record member 31. That frequency can then be selectively isolated by suitable filter means and supplied to a control circuit to perform the desired control operation, as will be explained in detail below.

Figure 5:
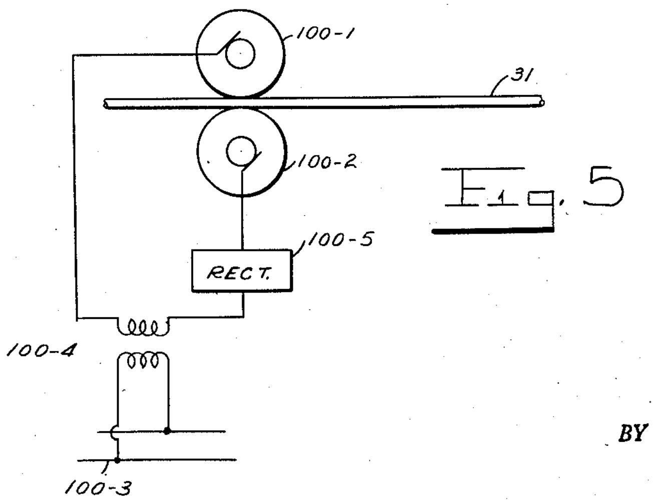
Fig. 5 is a simple diagram of a circuit for heat-treating the wire to establish a desired magnetic condition therein.

The record medium may be prepared for use in accordance with the invention by a heat treatment such as is illustrated in the simple schematic diagram of Fig. 5, in which one end portion of the record member 31, or an auxiliary control element 31—1, where a separate element is used, is passed between two rollers 100—1, 100—2 which serve to transmit and conduct an electric heating current to and through the record member 31 or 31—1 in the short zone of contact between the record member and the two rollers, as the record member passes through. Electric current is supplied to the rollers from a suitable source of energy 100—3, shown as an alternating current source, through transformer 100—4 and a rectifier 100—5. The speed of the record member 31 between the rollers 100—1 and 100—2 may be varied and correlated with the frequency of the heating pulses to establish throughout the control length of the record track a succession of spaced apart elements of a given degree of magnetizability interspersed with a succession of elements of a different degree of magnetizability. A signal may then be recorded over the control length of the record track and when this signal is reproduced a predetermined control frequency is produced.

Figure 6:
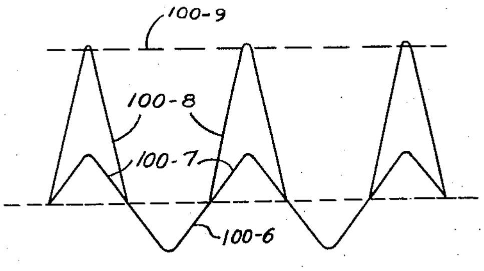
Fig. 6 illustrates the manner of heat treatment effected with the apparatus of Fig. 5.

The manner in which the heating effect is established in the wire in regularly spaced elemental lengths is illustrated in Fig. 6, which shows an alternating current wave 100—6, in solid line, representing the current supplied to the transformer 100—4, of which only the positive waves 100—7 are transmitted by the rectifier 100—5. Since the heating effect is proportional to the square of the current, the actual heating effect is illustrated by the upper solid line waves 100—8. The value of the current may be controlled so that the heating effect of the heat waves 100—8 will just reach, or slightly exceed, the temperature indicated by the elevated horizontal line 100—9, at which temperature the coercive condition of the wire will be diminished as desired.

Because of the rapid heating effect of the current applied in such manner to the wire record member, the heat zones in which the temperature achieves the value 100—9, sufficient to establish the desired change in magnetic condition, are definitely restricted to the spaced elemental lengths in which the temperature is specifically raised to the 100—9 value. The temperature rapidly drops with the current, and the inbetween sections remain relatively cold and unaffected. Additional cooling means may be provided to assure quick cooling of the wire as it passes through the heating zone between the two rollers 100—1, 100—2.

Another modification of the control element 31—1 may consist of a non-magnetic wire or tape, such as bronze or nickel, whose physical dimensions otherwise correspond to the physical dimensions of the main record member with which the control element will be used, and the control element will then be magnetically conditioned by electro-depositing iron thereon along spaced elemental lengths, so the control element will generally have the magnetic character corresponding to the schematic illustration in Fig. 2.

The recording system shown in Fig. 1 is arranged to carry on magnetic recording and reproducing operations under the control of a multi-blade selector switch generally designated 40 which is shown provided with a plurality of contactor blades 40—1, 40—2, 40—3, 40—4, 40—5, which are moved as a unit to one of a plurality of different contact positions, the numerals 1 to 5 applied to some of the contact positions indicating the different contact positions of the selector switch 40. Contact blades 40—1 to 40—3 of the selector switch 40 establish the recording circuits when the contact blades are in position 1 and they establish the playback circuits when the contact blades are in position 2.

When the selector switch is in the recording position 1, its contact blade 40—3 connects a source of high frequency oscillations or an oscillator 41 to a source of positive power supply indicated by a plus (+) sign, which is connected to the contact blade 40—3, the circuit as well as the other analogous circuits described hereinafter being completed by the ground connections shown, to which is also connected the negative terminals of all D. C. supply sources.

The high frequency erasing current supplied by the oscillator 41 to the erasing head 37 is of sufficiently large amplitude so that each longitudinal element of the thin moving magnetic recording medium 31, passing the gap region of the erasing head 37, is subjected to an alternating flux strong enough to erase any previous magnetic signal records of the moving medium and restore the magnetic elements thereof to a magnetically neutral condition. After being subjected to the magnetic erasing action by the erasing head 37, each element of the moving recording medium 31, upon reaching the gap region of the record transducing head 38, is subjected to a magnetic recording flux produced by the amplified signal currents which are to be recorded and a superimposed high frequency biasing flux component.

In order to ascertain when each respective end of the record member is being approached where the record member is connected to its associated reel, the monitoring head 39 is so disposed, as shown in Fig. 1, that the record member during normal recording operation will pass by the monitoring head first before reaching the erasing head 37. The monitoring head 39 will thus pick-up the established frequency or code signal from the control portion or control element 31—1 at the end of the record member, and will effect the desired control operation before the erasing head 37 may impose its erasing action on that portion or control element 31—1 of the record member.

During the reverse operation when the record member 31 is being rewound, and it is moving from the take-up reel 33 back onto the supply reel 34, the erasing head 37 is de-energized, since oscillator 41 is de-energized at switch point 1 of contact blade 40—3. The erasing head therefore has no effect on the control element 31—1 at the take-up reel end of the record member, even though that element 31—1 would reach the erasing head 37 before reaching the monitoring head 39.

The rewinding speed is about three times the normal recording speed. Therefore, two different frequencies may be derived from the two end control elements 31—1, and different control operations may be selectively effected, if desired.

In Fig. 1, a conventionally shown microphone 42 serves as a source of the signals which are to be recorded and a reproducing device, such as a loudspeaker 45 serves to reproduce the signals. During a recording operation, the microphone is connected by way of contact blade 40—1 to the input side of an amplifier 43, the output of which is supplied by way of contact blade 40—2 of the selector switch to the windings of the recording head 38 which records the signals, the circuits being completed by the ground connections shown.

The high frequency bias component of the recording flux is produced by a high frequency current component derived from the oscillator 41 by a circuit, such as shown, which includes an adjustable coupling condenser 44 for supplying an adjustable component of the high frequency oscillations to the output circuit of the amplifier 43 where it is mixed with the amplified signal currents supplied by the microphone 45 and amplified by the amplifier 43 and supplied thereby through its output circuit to the windings of the transducer head 38 which records the signals. The coupling condenser 44 and the other circuit elements of the system are designed to mix a suitable component of the high frequency oscillations derived from the oscillator 41 with the amplified signal current supplied by the microphone in such manner as to produce in the gap region of the recording head 38 the desired combination of the signal recording flux and the superimposed high frequency biasing flux component.

In general, when recording signals of the audible frequency range, good results are obtained by using a high frequency biasing flux of about 25 kilocycles per second and the same source of high frequency signals may be used for supplying a relatively large high frequency erasing current to the erasing head 37 as well as the small high frequency biasing component to the recording head 38.

To play back the magnetically recorded signals while the recording medium is moving in the same direction as during the recording process, the selector switch 40 is actuated to the playback position 2. When the selector switch 40 is in the playback position 2, its contact blade 40—3 disconnects the oscillator 41 from the source of power supply, thereby de-energizing the oscillator, and no high frequency erasing or biasing currents are supplied to the erasing head 37 and the transducer head 38. Furthermore, selector contact blades 40—1, 40—2 now connect the windings of the record transducer head 38, which operates now as a playback head, to the input side of the amplifier 43, the output of which is now supplied after amplification in an additional amplifier stage 43—A to the reproducing device 45 for reproducing the signals.

In the magnetic recording device shown in Fig. 1, the two reels 33, 34 with the recording medium stored thereon form part of a self-supporting detachable guide unit 2—10 designed for detachable interconnection with a motor or drive unit 4—10. The drive unit 4—10 is shown in the form of a casing in which are housed all the elements of the driving mechanism as well as the amplifier and the principal control elements of the device, and supplies the mechanical power required for reeling the magnetic recording medium from one reel to the other.

The drive mechanism of the drive unit 4—10 has a drive motor 4—20 which may be provided with a built-in speed reducing mechanism so as to drive a motor drive shaft 4—22 at a speed at which it may be directly coupled to the drive shaft 4—13 of the take-up reel 33 for driving it at the speed proper for carrying on recording or reproducing operations. The driving mechanism of the recording device shown is so designed as to assure that when one of the reels 33, 34 is driven for reeling thereon the recording medium, the other reel will at all times be subjected to a braking action sufficient to maintain the recording medium under tension, and that when the direction of the motion of the recording medium is reversed, the removal of the driving forces from one reel and the application to the other reel is controlled in a predetermined time sequence to assure that the two reels and the moving recording medium are first brought to a positive stop before the driving forces are applied to the other reel. The selective application of the driving forces to each reel is interlocked and subjected to the control of time action means so that whenever the application of the driving forces is reversed, the reel mechanism is first brought to a positive stop before the driving forces are applied to the other reel.

In the arrangement shown, the drive control mechanism includes coupling means, generally designated 4—30, for selectively coupling the motor drive shaft 4—22 either directly to reel drive shaft 4—13 or through a speed step-up mechanism to the other reel drive shaft 4—14 for driving the supply reel 34 in counterclockwise direction at an increased speed during the rewinding operation.

In the arrangement shown, the coupling means comprise slidably mounted coupling members 4—31, 4—32 which are operated by a coupling lever 4—35 from the position shown in which coupling member 4—31 establishes a direct coupling connection between the motor drive shaft 4—22 and the reel drive shaft 4—13 of the take-up reel 33 for rotating it in forward direction—or to the opposite coupling position indicated by dash-dot lines 4—35—R—in which coupling member 4—31 breaks the coupling connection from the motor drive shaft 4—22 to the drive shaft 4—13 of the take-up reel, and instead couples the motor drive shaft 4—22 to gear 4—36 of a train of step-up gears including gear 4—37, while the other coupling member 4—32, which is now in reverse coupling condition, couples the gear 4—37 to the rewind drive shaft 4—14 for rotating the supply reel at a higher speed in clockwise direction.

The control lever 4—35 is shown pivotally mounted on a fixed pivot 4—41 and one end thereof is connected through a pivot pin 4—44 to a spring-loaded toggle arm 4—43, the other end of which is pivotally held on a fixed pivot 4—45. The toggle arm 4—43 is formed of two telescopically mounted sliding toggle arm sections, the ends of which are biased apart by a compression spring 4—46 so that when the coupling lever 4—35 is moved past a center position, its toggle arm 4—43 with its compression spring 4—46 will bring the coupling lever either to the forward coupling position shown or to the opposite rewind coupling position indicated by dash line 4—35—R.

The coupling mechanism of the type described may be controlled either mechanically or electrically. In order to provide for remote control, the coupling mechanism shown is electrically controlled. In the form shown, the electrical control comprises two relay or solenoid members 53—F, 53—R held in fixed position and having core or armature members which are pivotally interconnected to moving portions of the coupling lever so that when the forward solenoid 53—F is energized, the coupling lever 4—35 will be actuated from the dash-dot line position 4—35—R to the full line position shown, and that when the rewind solenoid 53—R is energized, the coupling lever will be actuated to the dash-dot line position 4—35—R.

The drive control mechanism shown is arranged to utilize only a single time action means for assuring that whenever the drive control mechanism is actuated from either one or the other drive position to a standby position or to the opposite drive position, the time action means are actuated to make it impossible to establish the opposite drive connection until after a predetermined time action sufficient to assure that the reels have been brought to a stop before the opposite drive connection could be established, if the drive control mechanism is actuated to the opposite drive control position.

Fig. 1 illustrates in a simplified diagrammatic manner one form of such drive control arrangement. It utilizes as a time action means a single time delay relay 61, which is arranged to open its contacts 62 instantaneously upon the energization of the relay and to reclose with a desired time delay when the relay is energized, or, in other words, to instantaneously open a control circuit and to close the control circuit with a required time delay. The desired time action of relay 61 is supplied by a circuit including a condenser 63 and a resistor 64 interconnected with a condenser charging circuit which is controlled in such manner that the time required for charging the condenser to a predetermined potential determines the time delay with which relay 61 operates.

In the arrangement shown, the charging current to the condenser 63 is controlled by an electron tube 65 having an anode as well as a cathode 67 and a control grid 68. The positive terminal of a supply source indicated by B+ is connected to the output circuit including a resistance 69 and the winding of the relay 61 which are interconnected between the anode and the cathode 67 of tube 65, the circuits to the tube being completed by a ground connection to which the negative terminal of the B+ supply source is also connected.

The circuit elements associated with tube 65 and relay 61 including the condenser 63 and the resistor 64 are so designed that when the cathode is maintained at its normal temperature by suitable heating means, not shown, and the anode is energized as indicated, the condenser 63 will be charged by current flowing through the tube so as to apply to the control grid 68 a potential which causes the tube to pass sufficient current for energizing the relay 61 and cause it to keep its contacts 62 closed as long as no negative blocking potential is applied to the control grid 68 of tube 65.

The arrangement is such that when a negative blocking potential is applied to the control grid 68 of the tube, the current flow through the winding of relay 61 will be stopped or reduced and cause it to instantaneously open its contacts 62. The condenser 63 and the resistor 64 are so proportioned and interconnected with the other circuit elements associated with tube 65 that when the negative blocking potential is removed from control grid 68, the required time delay will elapse before the initiated current flow through the tube 65 has been able to charge up the condenser 63 to the proper potential at which the control or bias applied to the control grid 68 enables the tube to send through the winding of relay 61 a current sufficient for actuating the relay to close its contacts 62.

In the arrangement shown, the blocking potential is applied to the control grid 68 of tube 65 by the operation of the selector switch 40 which is utilized to control the recording, playback as well as the rewinding operations. Selector contact blade 40—4 applies a negative blocking potential to the control grid 68 whenever it is moved to or past position 3 from either one of its other positions 1, 2 or 4, 5. As a result, the relay opens each time the selector switch 40 is moved either from position 1 or 2 to position 3 or from position 5 or 4 to position 3, or from either one of positions 1 or 2 to either one of positions 4 or 5, or vice versa.

As explained above, the reversal of the driving connection to the reels or, in general, to the impelling elements which impel the recording medium, is controlled by the operation of the selector switch 40 and particularly by its set of contact blades 40—3, 40—4, 40—5.

The drive control circuits also include a normally closed forward relay limit switch 51—F which will be operated when the limit of the forward reeling motion is reached; and a similar normally closed rewind relay limit switch 51—R which is arranged to be operated when the limit of the rewinding operation is reached. Each of these two relay switches 51—F and 51—R serves to control, respectively, two auxiliary motor-control relays, namely, a forward relay 55—F and a rewind relay 55—R.

Both relay limit switches 51—F and 51—R are similar in construction. The forward relay limit switch 51—F, for example, comprises an actuating coil 51—F—1 and a holding or self-locking coil 51—F—2, two back contact switches 51—F—3 and 51—F—4, and a front contact switch 51—F—5. As previously mentioned, the other relay limit switch 51—R is provided with similar operating and holding coils, and front and back contacts.

Each limit switch 51—F and 51—R is arranged to be energized and operated to its actuated position whenever the limit of the forward reeling motion or the limit of the rewinding operation is reached. That limit will be indicated by the impression of the code signal on the winding of the monitoring head 39 by the fixed magnetic condition of the auxiliary or control portion 31—1 of the record member 31.

In order to provide for proper selective operation of the relay limit switches, the magnetic condition fixed upon the control portion of the record member will be such as to be distinct from any usual or ordinary speech or music signals that might normally be impressed upon the record member, consideration being taken, of course, of the operating speed at which the record member will be moved during the recording operation and during the rewinding operation.

To properly isolate the control signal code from the normal speech or music signals of the record member, the control signal picked-up by the monitoring head 39 is preferably first amplified by an amplifier 39—1, and the amplified signal is then supplied to two filters which for simplicity and convenience are identified as first low-pass filter 39—2 and second low-pass filter 39—3. The first low-pass filter 39—2 will transmit low frequency code signals at the limit of the forward reeling motion to energize the actuating coil 51—F—1 of the forward relay limit switch 51—F. The characteristics of the second low-pass filter 39—3 will be such as to suppress or attenuate the signals of that frequency so that the actuating coil 51—R—1 will be substantially unenergized.

During the reverse or rewinding operation, the code signals at the frequency resulting from the higher rewinding speed, when picked-up by the monitoring head 39 and amplified, will be transmitted by the second low-pass filter 39—3, but will be substantially suppressed or attenuated by the first low-pass filter 39—2, so that only the reverse relay limit switch 51—R will be actuated.

The operation of the limit switches as shown in simple diagrammatic form in Fig. 1 may now be considered. When the selector switch 40 is moved to recording or play back position, contact blade 40—5 will engage position contact 1 or 2 to close an energizing circuit from positive operating potential through operating coil of relay 55—F, and then through back contact switch 51—F—3 of the forward relay limit switch 51—F to point 2 of switch blade 40—4, and thence to negative operating potential. The forward drive relay 55—F will therefore be energized to control the forward driving operation of the motor as will be explained below.

Assuming now that the recording or play back operation has been performed to the extent that the limit of the forward reeling motion has been reached, the monitoring head 39 will pick-up the control signal from the auxiliary control record member 31—1 which will then be amplified and fed to the two filters. However, since only the first filter 39—2 will transmit the amplified signal at the end of the forward reeling motion, the forward limit switch relay 51—F will be actuated by the energization of its actuating coil, and the schematically illustrated magnetic core and switch structure will be raised to open the back contacts 51—F—3 and 51—F—4, and to close the front contact 51—F—5. Closure of the front contact 51—F—5 will complete a circuit for the self-holding coil 51—F—2 from positive operating potential through the holding coil 51—F—2, through the front contact 51—F—5, and then through an interlock circuit through back contact 51—R—4 of the reverse relay switch 51—R to negative operating potential. The forward limit switch relay 51—F thus locks itself in open position, and at the same time by the opening of its back contact switch 51—F—5 opens the energizing circuit of the forward control relay 55—F. The switch of relay 55—F is thereupon opened to open the energizing circuit to the motor. The motor is thereupon stopped to prevent further forward reeling of the record member 31.

By providing the interlock connection or the holding circuit of the limit switch 51—F through the back contact of the reverse limit switch 51—F, further forward reeling operation is prevented until the record member is rewound upon the supply reel 34.

For the sake of simplicity in describing the manner of operation of the present invention, the limit switch control action is shown here in simplest form, so that a full recording operation of the record member is required before it may be rewound. Obviously, whenever it would be desirable, provisions could be made to permit only partial recording or rewind or partial play back, without recording or play back or rewinding continuously to the limit of each of those operations. However, as indicated above, for the sake of simplicity, a straight-forward complete operation in recording or rewinding is shown in this application.

When the forward limit switch relay 51—F is energized it will therefore hold open the circuit of the forward motor controlling relay 55—F until the circuit of its holding coil 51—F—2 is opened by operation of the reverse limit switch relay 51—R when the record member 31 has been completely rewound and the limit of the rewinding operation has been reached.

At that time the limit of the rewinding operation will be indicated by the signal picked-up by the monitoring head 39, as amplified and transmitted by the second filter 39—3 to energize the reverse limit switch relay 51—R. That relay will energize its actuating mechanism and will open its back contact switch 51—R—4 and its back contact switch 51—R—3, and will close its front contact switch 51—F—5. Opening of back switch 51—R—4 will open the circuit of the holding coil of the forward limit switch relay 51—R permitting that switch relay to drop to its normal position at which it will close its back contact switch 51—F—4. The closure of that switch together with the closure of the front contact 51—R—5 of the reverse limit switch relay 51—R will complete the circuit for the holding coil 51—R—2 of the reverse limit switch relay 51—R. Relay 51—R will hold its switch mechanism in elevated position until the circuit of the holding coil 51—R—2 is subsequently opened by the forward limit switch relay 51—F, or by other suitable control switches which may be provided, as previously referred to, where a more flexible control arrangement may be desired to permit intermediate starts and stops during the recording and rewinding operations.

Operation of the reverse limit switch relay 51—R de-energizes the circuit of the coil of the reverse motor relay 55—R and prevents further operation of the motor while the mechanism is in a rewinding position.

The drive control circuit further includes a set of control contacts 56—F, 57—F which are operated from their normal release position to the operative position shown when the coupling lever, or, in general, the coupling means, are actuated to establish a forward drive coupling connection and a set of similar switches 56—R, 57—R which are operated from a normally biased position shown to the operative position when the coupling means are actuated to establish rewind driving connections. In the arrangement shown, the switches 56—F, 56—R control the selective energization and de-energization of the two coupling solenoids so as to de-energize the solenoid after it was energized to perform a drive reversal operation and after having performed its function is reversing the drive connection. The two other switches 57—F, 57—R control the energization of the drive motor 4—20 and operate to assure that the motor is de-energized during a drive reversal operation and to permit energization of the motor only when the drive reversing operation has reached a predetermined stage at which the energization and driving action of the motor are desirable.

In particular, the two sets of switches are shown controlled by a finger plate 4—46 suitably affixed to the control lever 4—35 so as to move therewith and is provided with two sets of fingers 4—47, 4—48 for operating the two sets of coupling control switches 56—F, 57—F, 56—R, 57—R. The switches 56—F, 57—F, 56—R, 57—R as well as the similar other switches shown are of the micro-switch type which operate with a snap action when actuated by a push pin or similar actuating element. In the arrangement shown, the several switches which are operated by the control lever 4—35, or, in general, the coupling control means, are designed to operate in the following manner:

It is assumed that the drive mechanism is in the condition shown in which the coupling mechanism establishes the driving connection from the motor 4—20 to forward drive reel shaft 4—13. In the arrangement shown, the reversal of the drive connection is controlled by the selective closure of the contacts of either the forward drive relay 55—F or rewind drive relay 55—R, which also serve to control the energization of the motor. The two auxiliary relays 55—F, 55—R perform merely the auxiliary function of making it possible to separate the power line circuits which supply operating power for the motor 4—20 and the coupling solenoids 53—F, 53—R from the operating circuits which are used for remotely controlling the operation of the drive mechanism and the recording and reproducing operations from low power relay supply sources which are indicated in the diagram by the plus (+) sign and ground connection.

With the mechanism in the condition shown, when the contacts of rewind relay 55—R are closed, current will be sent from one terminal of a source of power supply indicated by a double plus (++) sign through the closed coupling interlocked contacts 56—R, and through the rewind solenoid 53—R, the energized circuit of which is completed only if the time delay relay 61 closes its contacts which connect the circuit to the positive terminal of the power supply indicated by a double minus (——) sign, the double plus (++) and double minus (——) signs being used for the sake of simplicity to indicate a conventional source of power which may be either an alternating current source or a direct current source for supplying power to the motor and to the operating elements, such as the solenoids of the coupling mechanism.

Upon energization, the rewind solenoid 53—R will start moving the coupling lever 4—35 from the coupling position shown toward the dash-dot line position 4—35—R. The two coupling interlock switches 56—R, 57—R which are operated by the control lever as it moves towards the rewind coupling position are arranged to be actuated in a predetermined sequence in order to assure that the motor energizing switch 57—R operates to energize the motor before the coupling member 4—32 has established coupling engagement with the coupling teeth of the coupling member 4—32—R through which it is coupled to the rewind drive shaft 4—14, and that the coupling interlock switch 56—R shall operate to open and de-energize the rewind solenoid 53—R after the coupling teeth of coupling elements 4—32, 4—32—R are sufficiently engaged and the coupling lever is past the over-center position. The other set of coupling interlock switches 56—F, 57—F are arranged to operate in an analogous manner when the forward solenoid 53—F is energized to operate the coupling mechanism to reverse the drive connection from rewind to forward drive.

With the foregoing arrangement, the drive mechanism will drive the recording medium in forward direction whenever the contacts of forward relay 55—F are closed, provided the coupling mechanism is in the forward coupling position. Similarly, the driving mechanism will drive the recording medium in the rewind direction whenever the contacts of rewind relay 55—R are closed, provided the coupling mechanism is in the rewind coupling position indicated by the dash-dot line 4—35—R.

Since the circuits controlled by the forward drive relay 55—F and rewind relay 55—R serve also to control the operation of the coupling reversing solenoids 53—F, 53—R, the selective energization of either of the contacts of one or the other of the drive control relays 55—F, 55—R will also bring about a reversal of the coupling connections if one or the other of the relay contacts is actuated to the closed position for driving the recording medium in one direction while the coupling mechanism is in a position in which it establishes a driving connection in the other direction.

Thus, if the drive mechanism is in the condition shown in Fig. 1 in which the drive shaft of motor 4—20 is coupled to the drive shaft 4—13 of the take-up reel for driving it in forward direction, and the contacts of the rewind relay 55—R are actuated to the closed position, it will complete a circuit leading by way of the closed coupling interlock contacts 56—R to the solenoid 53—R bringing about its energization, provided the contacts of the time delay relay 61 are closed; whereupon, the rewind solenoid 53—R will be operated to reverse the coupling connection from the position shown to the position corresponding to the rewind drive position indicated by the dash-dot line 4—35—R. When so actuated to the rewind position, the movement of the coupling mechanism automatically operates the interlock contacts 56—R, 57—R to successively energize the motor and de-energizes the rewind solenoid 53—R as it reaches the rewind coupling position of dash-dot line 4—35—R.

In other words, the circuit leading to the two selectively operating contacts of the forward drive relay 55—F and the rewind drive relay 55—R may be directly utilized for controlling the operation of the drive mechanism to start and stop the driving action in one or the other direction or to at any time reverse the driving motion, in which case, however, the operation of the time action means 61 delays the reversal of the driving connections until the mechanism has been brought to a stop. In the arrangement shown, the selective actuation of the forward drive relay 53—F, 53—R is controlled by the operation of the selector switch blades 40—4, 40—5 by bringing them from a standby position 3 to any one of the forward drive positions 1, 2 or to any one of the rewind positions 4, 5.

Thus, when the selector switch blades 40—5 is in any one of the forward drive positions 1, 2, as shown in Fig. 1, the two selector switch blades establish the following energizing circuit for the forward drive relay 55—F. From the selector contact blade 40—5 which is connected to one terminal of the relay supply source, through the winding of the forward drive relay 55—F, through the back contacts 51—F—3 of the forward limit switch relay 51—F to a common circuit portion leading to the contacts of contact positions 2, 4, 5 of the selector contact blade 40—4.

In an analogous manner, the rewind drive relay 55—R will be energized to operate its contacts and cause the recording medium to be rewound whenever the selector contact blades 40—4, 40—5 are in either positions 4 or 5. It will be noted that when the selector switch 40 with its drive control blades is actuated from either one of positions 1, 2 to either one of positions 4, 5, or vice versa, contact blades 40—4, on reaching or moving past the standby position 3, applies a blocking potential to the control circuit of time delay relay 61, thereby instantaneously causing it to open its contacts and de-energize the operating circuits of both coupling solenoids. Because of the time delay action in reclosing its contacts, the time delay relay 61 will keep the energizing circuits of the coupling solenoids 53—F, 53—R de-energized for the time required in order to bring the motor to a stop, in all cases when the selector switch 40 has been actuated from either one of the forward drive positions 1, 2 to either one of the rewind positions 4, 5, or vice versa.

The control arrangement of the invention may also be modified so that the forward limit switch automatically stops the forward reeling and starts rewinding, and the rewind limit switch stops the rewinding.

In describing an exemplification of the invention, I have shown particularly the manner in which a control member of ferro-magnetic material of high coercive force and retentivity may be subjected to a special heat treatment so that the high coercive properties may be modified along elemental lengths of the record member. The spacing of the treated portions may be predetermined so that a voltage of predetermined desired frequency will be generated in a circuit magnetically coupled with a record member when that member is moved at operating speed relative to that circuit. The frequency thus generated in the circuit may be selectively transmitted through a filter to an operating relay that is to perform a desired control function, or the generated frequency may be applied directly to a relay that is designed to be responsive directly to such frequency.

Such control frequency is preferably in the range below the frequency range of speech, music, or other signals that are to be recorded. The upper cut-off point of a filter when such device is used will therefore be made to occur at a frequency below the lowest frequency of the signals to be recorded.

Another form of the record member which may be made in accordance with my invention involves a base member of non-ferro-magnetic material upon which ferro-magnetic material is electro-deposited in spaced elemental lengths in such manner as to create a magnetic condition analogous to that described in connection with the heat treated record member. The material deposited on the non-magnetic base may be electro-deposited, for example, by a process in which a plating bath is maintained at a temperature of about 70° C. with a pH value of 5.0, and a current density of 100 amperes D. C. superimposed on 200 amperes A. C. per square foot of the plating surface area. The magnetic record track material thus united to the base of non-magnetic material has a very desirable characteristic as a magnetic recording medium, and exhibits a coercive force of about 200 oersteds, and a remanence of about 10,000 gauss.

Generally my invention contemplates that the frequency generated in an inductively coupled circuit by a relative movement of the record member with respect to the circuit is the result of a magnetic condition in the record member of Fig. 2 where only alternate lengths of the record member would be magnetized and the in-between lengths are substantially non-magnetizable.

The expression "magnetic record transducing" as used herein in the specification and claims is intended to mean either the operation of magnetically recording signals on a magnetic recording medium or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a magnetic record transducing apparatus for transducing records, such as recording or reproducing magnetic signals: two revolvably mounted reels; an elongated record track arranged to form two coils held on said reels and an intermediate track portion extending between said coils so that when said track is wound on one reel it is unwound from the other reels; a magnetic record transducing head means including means for reproducing magnetic signal records from said track, and means for magnetizing elements of said record track passing said head means when recording and erasing magnetic signals; said reels forming part of guide means including impelling means for moving said record track past said head means; a predetermined control length of said record track being formed of a succession of elements of such predetermined degrees of magnetizability spaced by elements of a different degree of magnetizability so as to induce in said transducer head during reproduction from a recorded record track a control signal of a predetermined control frequency; said control length of said record track having length portions permanently magnetically conditioned to a desired degree at which the maximum magnetizing forces exerted thereon by said head means are insufficient to substantially change the desired magnetic conditions of said control length portions; and a control circuit connected to said transducer head and including a control element operative in response to said control signal for subjecting the operation of said record transducing apparatus to a desired control action.

2. In a magnetic record transducing apparatus for transducing records such as recording or reproducing magnetic signals; a long magnetic record track; magnetic record transducing head means including means for recording and reproducing magnetic signal records from said track and for providing a control signal; guide means including impelling means for guiding and impelling said record track past said head means; a predetermined control length of said record track being formed of a succession of elements of such predetermined degrees of magnetizability spaced by elements of a different degree of magnetizability constituting a magnetic control signal operative to induce in said head means when reproducing a control signal of a predetermined control frequency; said control length of said record track having length portions permanently magnetically conditioned to a desired degree at which the maximum magnetizing forces exerted thereon by said head means when recording are insufficient to substantially change the desired magnetic conditions of said control length portions; and a control circuit connected to said head means and including a control element operative in response to said control signal for subjecting the operation of said record transducing apparatus to a desired control action.

3. In a magnetic record transducing apparatus for transducing records such as recording or reproducing magnetic signals: a long magnetic record track; magnetic record transducing head means including means for recording and reproducing magnetic signal records from said track and for providing a control signal; guide means including impelling means for guiding and impelling said record track past said head means; a predetermined control length of said record track being formed of a succession of elements of such predetermined degrees of magnetizability spaced by elements of a different degree of magnetizability constituting a magnetic control signal operative to induce in said head means when reproducing a control signal of a predetermined control frequency; said control length of said record track having length portions permanently magnetically conditioned to a desired degree at which the maximum magnetizing forces exerted thereon by said head means when reproducing are insufficient to substantially change the desired magnetic conditions of said control length portions; and a control circuit connected to said head means and including a control element operative in response to said control signal for interrupting the operation of said record transducing apparatus.

4. In a magnetic record transducing system: a magnetic record member; transducer head means cooperative with the record member, including means for reproducing magnetic signal records from said record member, means for magnetizing elements of said record member passing said head means when recording and means for providing a control signal; reeling means for moving and winding the magnetic record member, including a supply reel and a take-up reel; the trailing end of the record member at the supply reel having a first control length magnetized according to a predetermined frequency code; the leading end of said record member at the take-up reel having a second control length magnetized according to a predetermined frequency code; each of said control lengths having length portions comprising elements having a given degree of magnetizability interspersed with other elements having a different degree of magnetizability at which the maximum magnetizing forces exerted by said head means when recording are insufficient to substantially change the magnetic conditions of said other elements; and control means having a first circuit portion connected to said head means and responsive to a code signal generated in said head means by said first control length for causing said reeling means to stop a forward reeling operation and start a rewinding operation; said control means having a second circuit portion connected to said head means and responsive to a code signal generated in said head means by said second control length for stopping a rewinding operation.

CARY B. JONES.

REFERENCES CITED

The following references are of record in the file of this patent:

UNITED STATES PATENTS

| Number | Name | Date |
|---|---|---|
| 934,600 | Fuller | Sept. 21, 1909 |
| 1,889,380 | Ruben | July 14, 1931 |
| 1,909,765 | Jenkins | May 16, 1933 |
| 2,167,188 | Schaarwachter | July 25, 1939 |
| 2,254,933 | Bryce | Sept. 2, 1941 |
| 2,335,277 | Heller | Nov. 30, 1943 |
| 2,396,409 | Berzer | Mar. 12, 1946 |
| 2,422,143 | Somers | June 10, 1947 |

FOREIGN PATENTS

| Number | Country | Date |
|---|---|---|
| 297.327 | Great Britain | Dec. 17, 1929 |
| 441,479 | Great Britain | Jan. 30, 1936 |